Patented July 20, 1926.

1,593,191

UNITED STATES PATENT OFFICE.

JOHANN FRIEDRICH MEYER, OF BERLIN, GERMANY.

MANUFACTURE OF NONALCOHOLIC BEER AND THE LIKE.

No Drawing. Application filed June 2, 1925, Serial No. 34,462, and in Germany March 9, 1921.

This invention has reference to improvements in the manufacture of substantially non-alcoholic beers, and it is intended to devise means of producing a better product and of facilitating the process of manufacture of the same. It is known to render the wort acid by the addition of bacteria in order to produce a certain percentage of lactic acid in the manufacture of beers approximately free from alcohol and then to submit the liquor to a short alcoholic fermentation interrupted by cooling, the known process being partially set forth in Letters Patent No. 1,537,252 dated May 12, 1925 and No. 1,588,126 dated June 8, 1926. Now, in accordance with this my present invention, provision is made to facilitate the production and the maintaining of the proper degree of acidity of the wort, and to perfect the clearing and palatability of the beer, while, at the same time, reducing the costs of production.

In the practice of this invention, the degree of acidity of the wort required for the covering up of the sugar taste is accomplished wholly or mainly by correspondingly conducting the process of malting and mashing. The liquid or fluid obtained after the interruption of the fermentation is separated off in a preferred embodiment of our invention in a centrifugal machine, which is not covered up with filter cloths.

By the formation of lactic acid in malt for the purpose of producing the acidity required in beers approximately free from alcohol, the desired souring of the beer wort may be very rapidly and reliably obtained by merely keeping the malt at a somewhat higher temperature and without any addition of bacteria and by proceeding in this manner the acidity may be exactly adjusted to certain definite values. When additions to the wort is desired the souring may be adjusted to a certain percentage, say for instance one per cent, by the addition of lactic acid, and by the addition of weak acids or of acid salts the exact degree of acidity aimed at can be controlled by acid salts or an alkaline solution. The otherwise necessary boiling of the wort with the infusion of hops used for the interruption of the lactic fermentation is not necessary in the new process, inasmuch as it is possible to directly add an extract of hops to the sour wort and then to ferment one percent of the extract by means of yeast.

By treating the liquid in centrifugal machines after the interruption of the fermentation and without the employment of filtering layers, an exceedingly efficient and far-reaching clarification of the beer is moreover produced, while the desired high degree of freedom from alcohol is maintained. This favorable clarification cannot be produced with the ordinary filtering devices in which the beer to be purified is forced through a sieve or a filtering or straining layer by centrifugal action, inasmuch as these filters will become clogged after a short time and operate very uneconomically, so that a useful product cannot be obtained thereby for practical purposes. By submitting, however, the liquid to centrifugal action without filtration, it does not only become possible to arrive at an advantageous clarification, but all possibility of subsequent fermentation is also obviated by the separating off of the still existing ferments, it being impossible to exclude such subsequent fermentation by mere cooling under any conditions.

In accordance therewith, the invention does not only provide a simple process for the manufacture of beers approximately free from alcohol, but it yields a product of high value, of good taste, perfectly clear appearance, very high degree of freedom from alcohol and of low cost. It is possible by this means to provide both light as well as dark beers by suitably selecting the amount of lactic acid produced in the wort, say for instance between nine one hundredths and sixteen one hundredths per cent. After the fermentation, the liquid is conducted in the usual manner through suitable cooling apparatus in which it is cooled so as to stop the production of alcohol, whereupon it is passed to the centrifugal machine in which it is clarified in accordance with the counter-pressure principle of centrifugal force applied to fluids for separation. The perfectly clear liquid may then be Pasteurized in bottles or barrels.

In the malting process, a higher degree of acidity may, for instance, be produced by extending the duration of the malting from seven to eight days and keeping the temperature of the material to be malted at nineteen degrees centigrade. By this means an increase in the percentage of acid with a simultaneous further disintegration and decomposition is obtained in consequence of the prolonged and more vigorous growing of the sprouts in the individual grains.

In the mashing operation the increase of acidity is produced, for instance, by causing the mashing, that is to say the commencement of the brewing operation, to be effected not on the day of the boil, but on the evening preceding the same and by keeping the mashing temperature for about ten hours at ten degrees centigrade. For the acid bacteria adhering to the comminuted malt the most favorable condition is thereby produced for their propagation. With an increase of the rate of manufacture and a more extensive utilization of the mashing containers, it will be advisable to provide separate preliminary souring containers for the production of the acidity in the material to be mashed.

To produce acidification of the mash, two per cent thereof is allowed to stand and is subjected to a temperature of thirty-six degrees centigrade for a period of twenty-four hours, the acidification being controlled by the addition of or sprinkling with an alkaline solution, for instance, with a fluid containing one-tenth of ordinary soda lye.

To acidify on malting, the total quantity is malted for eight or nine days, instead of six or seven days, at a temperature of twenty-three to twenty-four degrees centigrade which is higher than the ordinary temperature used for the malting of the brew, and the product will be a near beer having a non-intoxicating alcoholic content, and in which the sugary taste is suppressed, by acidification of the wort and by lactic acid followed by a short alcoholic fermentation, which is interrupted by cooling. The acidity of the wort is obtained during the malting and mashing, fermentation being interrupted by cooling, after which the fluid content of the wort is separated and clarified solely by centrifugal action, the product then being bottled and Pasteurized.

I claim:—

The process of making beer which contains alcohol of a volume non-violative of the national prohibition act, which consists in malting cereal from seven to eight days at a temperature of approximately 19° centigrade, mashing for approximately ten hours at 10° centigrade to produce acidity of the mash, making a malt-wort extract from the mash, subjecting the aforesaid malt-wort extract to a short alcoholic fermentation and producing a sufficiency of acid reaction products during the fermentation to modify the sugar contents of the product as to flavor, stopping the fermentation in such malt-wort extract by cooling, and clarifying the final product without contact with atmospheric air during such clarification.

In testimony whereof I affix my signature.

JOHANN FRIEDRICH MEYER.